(12) United States Patent
Cho et al.

(10) Patent No.: US 12,407,703 B2
(45) Date of Patent: Sep. 2, 2025

(54) METHOD FOR DETECTING AND ANALYZING TIME-SERIES DATA BASED ON CYBER THREAT FRAMEWORK

(71) Applicant: ASTRON SECURITY INC., Seoul (KR)

(72) Inventors: Keun Seok Cho, Anyang-si (KR); Dong Ik Kwak, Hwaseong-si (KR)

(73) Assignee: ASTRON SECURITY INC., Seoul (KR)

( * ) Notice: Subject to any disclaimer, the term of this patent is extended or adjusted under 35 U.S.C. 154(b) by 176 days.

(21) Appl. No.: 18/469,721

(22) Filed: Sep. 19, 2023

(65) Prior Publication Data
US 2025/0016182 A1   Jan. 9, 2025

(30) Foreign Application Priority Data
Jul. 7, 2023 (KR) .......................... 10-2023-0088474

(51) Int. Cl.
*H04L 9/40* (2022.01)
*G06F 9/54* (2006.01)

(52) U.S. Cl.
CPC .......... *H04L 63/1425* (2013.01); *G06F 9/542* (2013.01); *H04L 63/1416* (2013.01)

(58) Field of Classification Search
CPC .. H04L 63/1425; H04L 63/1416; G06F 9/542
USPC ......................................................... 726/23
See application file for complete search history.

(56) References Cited

U.S. PATENT DOCUMENTS

| | | | | |
|---|---|---|---|---|
| 11,640,470 | B1* | 5/2023 | Amar | G06Q 10/0635 726/22 |
| 12,135,788 | B1* | 11/2024 | Sreekanta | G06F 21/57 |
| 12,159,723 | B2* | 12/2024 | Turgeon | G16H 50/70 |
| 12,265,627 | B1* | 4/2025 | Wood | G06F 21/565 |
| 2010/0281536 | A1* | 11/2010 | Richards | H04L 63/101 726/22 |
| 2022/0385678 | A1* | 12/2022 | Bobak | H04L 41/22 |
| 2023/0153425 | A1* | 5/2023 | Yuceer | H04L 63/1425 726/23 |

(Continued)

FOREIGN PATENT DOCUMENTS

| | | |
|---|---|---|
| JP | 2015-121968 A | 7/2015 |
| JP | 2021082083 A | 5/2021 |
| JP | 2022131621 A | 9/2022 |

(Continued)

OTHER PUBLICATIONS

Nick Rago, "Mapping the Mitre Attack Framework to API Security", Salt Security White Paper, Feb. 9, 2023, https://salt.security/blog/mapping-the-mitre-att-ck-framework-to-api-security?_gl=1*tt7ro4*_ ga*MTczODYxMzAzNS4xNzA0MzQyMjYz*_ ga_DVMFZZZWP4*MTcwNDMOMjl2Mi4xLjEuMTcwNDMOOTQ3MC41Ny4wLjA.

(Continued)

*Primary Examiner* — Badrinarayanan
(74) *Attorney, Agent, or Firm* — NKL LAW; Jae Youn Kim (57) ABSTRACT

This disclosure details a method for detecting and analyzing time-series data with a cyber threat framework. It involves determining target API events, mapping these to threat behaviors, creating threat scenarios, assessing matching degree and risk, predicting threat behaviors based on risk grades, and providing solutions.

10 Claims, 12 Drawing Sheets

(56) References Cited

U.S. PATENT DOCUMENTS

2023/0153427 A1* 5/2023 Croteau .................. H04L 63/00
726/22
2024/0396998 A1* 11/2024 Ashfield ............. H04M 3/4365

FOREIGN PATENT DOCUMENTS

| KR | 10-2005-0095147 A | 9/2005 |
| KR | 20140139384 A | 12/2014 |
| KR | 10-2419451 B1 | 7/2022 |
| KR | 102516819 B1 | 4/2023 |

OTHER PUBLICATIONS

Japanese Patent Office, Notice of Allowance for Japanese Patent Application No. 2023-155443, Sep. 17, 2024.

* cited by examiner

FIG. 1

| Reconnaissance | Resource Development | Initial Access | Execution |
|---|---|---|---|
| 10 techniques | 8 techniques | 9 techniques | 14 techniques |
| Active Scanning | Acquire Access | Drive-by Compromise | Cloud Administration Command |
| Gather Victim Host Information | Acquire Infrastructure | Exploit Public-Facing Application | Command and Scripting Interpreter |
| Gather Victim Identity Information | Compromise Accounts | External Remote Services | Container Administration Command |
| Gather Victim Network Information | Compromise Infrastructure | Hardware Additions | Deploy Container |
| Gather Victim Org Information | Develop Capabilities | Phishing | Exploitation for Client Execution |
| Phishing for Information | Establish Accounts | Replication Through Removable Media | Inter-Process Communication |
| Search Closed Sources | Obtain Capabilities | Supply Chain Compromise | Native API |
| Search Open Technical Databases | Stage Capabilities | Trusted Relationship | Scheduled Task/Job |
| Search Open Websites/Domains | | Valid Accounts | Serverless Execution |
| Search Victim-Owned Websites | | | Shared Modules |
| | | | Software Deployment Tools |
| | | | System Services |
| | | | User Execution |
| | | | Windows Management Instrumentation |

FIG. 2

| Persistence | Privilege Escalation | Defense Evasion |
|---|---|---|
| 19 techniques | 13 techniques | 42 techniques |
| Account Manipulation (5) | Abuse Elevation Control Mechanism (4) | Abuse Elevation Control Mechanism (4) |
| BITS Jobs | Access Token Manipulation (5) | Access Token Manipulation (5) |
| Boot or Logon Autostart Execution (14) | Boot or Logon Autostart Execution (14) | BITS Jobs |
| Boot or Logon Initialization Scripts (5) | Boot or Logon Initialization Scripts (5) | Build Image on Host |
| Browser Extensions | Create or Modify System Process (4) | Debugger Evasion |
| Compromise Client Software Binary | Domain Policy Modification (2) | Deobfuscate/Decode Files or Information |
| Create Account (3) | Escape to Host | Deploy Container |
| Create or Modify System Process (4) | Event Triggered Execution (16) | Direct Volume Access |
| Event Triggered Execution (16) | Exploitation for Privilege Escalation | Domain Policy Modification (2) |
| External Remote Services | Hijack Execution Flow (12) | Execution Guardrails (1) |
| Hijack Execution Flow (12) | Process Injection (12) | Exploitation for Defense Evasion |
| Implant Internal Image | Scheduled Task/Job (5) | File and Directory Permissions Modification (2) |
| Modify Authentication Process (8) | Valid Accounts (4) | Hide Artifacts (10) |
| Office Application Startup (6) |  | Hijack Execution Flow (12) |
| Pre-OS Boot (5) |  | Impair Defenses (10) |
| Scheduled Task/Job (5) |  | Indicator Removal (9) |
| Server Software Component (5) |  | Indirect Command Execution |
| Traffic Signaling (2) |  | Masquerading (7) |
| Valid Accounts (4) |  | Modify Authentication Process (8) |
|  |  | Modify Cloud Compute Infrastructure (4) |
|  |  | Modify Registry |
|  |  | Modify System Image (2) |
|  |  | Network Boundary Bridging (1) |
|  |  | Obfuscated Files or Information (11) |

FIG. 2 CONTINUED

| Credential Access 17 techniques | Discovery 31 techniques | Lateral Movement 9 techniques | Collection 17 techniques |
|---|---|---|---|
| Adversary-in-the-Middle | Account Discovery | Exploitation of Remote Services | Adversary-in-the-Middle |
| Brute Force | Application Window Discovery | Internal Spearphishing | Archive Collected Data |
| Credentials from Password Stores | Browser Information Discovery | Lateral Tool Transfer | Audio Capture |
| Exploitation for Credential Access | Cloud Infrastructure Discovery | Remote Service Session Hijacking | Automated Collection |
| Forced Authentication | Cloud Service Dashboard | Remote Services | Browser Session Hijacking |
| Forge Web Credentials | Cloud Service Discovery | Replication Through Removable Media | Clipboard Data |
| Input Capture | Cloud Storage Object Discovery | Software Deployment Tools | Data from Cloud Storage |
| Modify Authentication Process | Container and Resource Discovery | Taint Shared Content | Data from Configuration Repository |
| Multi-Factor Authentication Interception | Debugger Evasion | Use Alternate Authentication Material | Data from Information Repositories |
| Multi-Factor Authentication Request Generation | Device Driver Discovery | | Data from Local System |
| Network Sniffing | Domain Trust Discovery | | Data from Network Shared Drive |
| OS Credential Dumping | File and Directory Discovery | | Data from Removable Media |
| Steal Application Access Token | Group Policy Discovery | | Data Staged |
| Steal or Forge Authentication Certificates | Network Service Discovery | | Email Collection |
| Steal or Forge Kerberos Tickets | Network Share Discovery | | Input Capture |
| Steal Web Session Cookie | Network Sniffing | | Screen Capture |
| Unsecured Credentials | Password Policy Discovery | | Video Capture |
| | Peripheral Device Discovery | | |
| | Permission Groups Discovery | | |
| | Process Discovery | | |
| | Query Registry | | |
| | Remote System Discovery | | |
| | Software Discovery | | |
| | System Information Discovery | | |
| | System Location Discovery | | |

FIG. 2 CONTINUED

| Command and Control 16 techniques | Exfiltration 9 techniques | Impact 13 techniques |
|---|---|---|
| Application Layer Protocol | Automated Exfiltration | Account Access Removal |
| Communication Through Removable Media | Data Transfer Size Limits | Data Destruction |
| Data Encoding | Exfiltration Over Alternative Protocol | Data Encrypted for Impact |
| Data Obfuscation | Exfiltration Over C2 Channel | Data Manipulation |
| Dynamic Resolution | Exfiltration Over Other Network Medium | Defacement |
| Encrypted Channel | Exfiltration Over Physical Medium | Disk Wipe |
| Fallback Channels | Exfiltration Over Web Service | Endpoint Denial of Service |
| Ingress Tool Transfer | Scheduled Transfer | Firmware Corruption |
| Multi-Stage Channels | Transfer Data to Cloud Account | Inhibit System Recovery |
| Non-Application Layer Protocol | | Network Denial of Service |
| Non-Standard Port | | Resource Hijacking |
| Protocol Tunneling | | Service Stop |
| Proxy | | System Shutdown/Reboot |
| Remote Access Software | | |
| Traffic Signaling | | |
| Web Service | | |

| No. | API Event Type | Tactics / ID | Technique / ID |
|---|---|---|---|
| 1 | Phishing Email Received | Initial Access(TA0043) | Spear phishing Attachment (T1566.001) |
| | | | Spear phishing Link(T1566.002) |
| 2 | Command Execution | Execution(TA0002) | Command and Scripting Interpreter (T1059) |
| 3 | File Manipulation | Discovery(TA0007) | File and Directory Discovery (T1083) |
| | | | File Deletion (T1070.004) |
| 4 | User Log in Success | - | - |
| 5 | File Exfiltration | Collection(TA0009) | Data from Local System (T1005) |
| | | | Exfiltration Over Alternative Protocol (T1048) |
| 6 | Exfiltration Started | Exfiltration(TA0010) | Exfiltration Over Web Service(T1567) |
| 7 | Account Login | Persistence(TA0003), Initial Access(TA0001) | Valid Accounts (T1078) |
| 8 | System Health Check | - | - |
| 9 | Lateral Movement Attempt | Lateral Movement(TA0008) | Remote Desktop Protocol (T1021.001) |
| | | | Pass the Ticket (T1550.003) |
| | | | Windows Admin Shares (T1021.002) |
| 10 | Configuration Change | - | - |

| No. | Threat Scenario | Threat Scenario's Technique in Match with Past Scenario | | | Degree of Matching | Risk | Risk Grade |
|---|---|---|---|---|---|---|---|
| 1 | Spear Phishing Campaign with File Exfiltration | Spear phishing Attachment (T1566.001) ▶ File and Directory Discovery (T1083) ▶ Exfiltration Over Alternative Protocol (T1048) | | | 80 | 35 | B |
| 2 | Command Execution for Unauthorized Data Access | Command and Scripting Interpreter (T1059) ▶ Data from Local System (T1005) ▶ Valid Accounts (T1078) | | | 65 | 85 | S |
| 3 | Phishing Email with File Manipulation and Exfiltration | Spear phishing Link (T1566.002) ▶ File Manipulation (T1105) ▶ Exfiltration Over Web Service (T1567) | | | 70 | 60 | A |
| 4 | Remote Access Trojan (RAT) with Data Exfiltration | Remote Desktop Protocol (T1021.001) ▶ Exfiltration Over Alternative Protocol (T1048) | | | 25 | 30 | D |
| 5 | Pass the Ticket Attack with Lateral Movement Techniques | Pass the Ticket (T1550.003) ▶ Lateral Movement (T1074) | | | 40 | 15 | D |
| 6 | Malicious Insider with Unauthorized Configuration Change | Valid Accounts (T1078) ▶ Configuration Change (T1602) | | | 15 | 70 | C |

METHOD FOR DETECTING AND ANALYZING TIME-SERIES DATA BASED ON CYBER THREAT FRAMEWORK

BACKGROUND OF THE DISCLOSURE

Field of Disclosure

The present disclosure relates to a method for detecting and analyzing time-series data based on a cyber threat framework, and more particularly, to a method for generating virtual threat scenarios based on data for API events occurring time-sequentially and analyzing and coping with a cyber threat in advance through comparison of the virtual threat scenarios.

Related Art

The damage from cybersecurity threats, which are gradually becoming more sophisticated, centering on new or variant malware, has been increasing. In particular, attacks targeting vulnerabilities of servers are increasingly being carried out as zero-day attacks, which makes it easy and quick to infiltrate into the servers by exploiting vulnerabilities of web applications.

In order to reduce such damage even a little and to respond at an early stage, countermeasure technology has been advancing through multi-dimensional pattern composition, various types of complex analysis, etc. However, recent cyber-attacks tend to increase day by day rather than being adequately responded to within a control range.

These cyberattacks threaten finance, transportation, environment, health, etc. that directly affect lives of people beyond the existing information and communication technology (ICT) infrastructure.

One of basic technologies to detect and respond to most existing cybersecurity threats is to create a database of patterns for cyberattacks or malware in advance, and utilize appropriate monitoring technologies where data flow is required.

Existing technology has evolved based on a method of identifying and coping with threats when a data flow or code matching a monitored pattern is detected.

Such existing technology has an advantage of being able to rapidly and accurately perform detection when a data flow or code matches a previously secured pattern. However, the technology has a problem in that, in the case of a new or mutant threat for which a pattern is not secured or is bypassed, detection is impossible or it takes a significantly long time for analysis.

As a related art, Korea Patent No. 10-2419451 discloses "System And Method Of Automatizing Threat Analysis Based On Artificial Intelligence".

This related art relates to a system and a method of automatizing a threat analysis based on artificial intelligence. The system includes: a playbook automatic-generation module configured to generate a playbook based on a template by utilizing an artificial learning model; a playbook verification and management module configured to verify effectiveness of the playbook generated by the playbook automatic-generation module; a playbook database configured to save the playbook verified by the playbook verification and management module; and a playbook execution module configured to automatically execute any playbook corresponding to a detected event through matching therebetween from the playbook database. Accordingly, by automatically generating and verifying a playbook and reinforcing the playbook according to characteristics of a security control center, an environment may be provided where security control personnel (controllers) can focus only on important security events and analyze and respond to such events.

However, in the aforementioned related art, since analysis and response are performed only on the generated playbook, it is not possible to respond to cyber security threats that change and evolve day by day.

Related Document

Patent Document (Patent Document 1) Korean Patent No. 10-2419451

SUMMARY OF THE DISCLOSURE

One aspect of the present disclosure is to analyze a large amount of cyber security data to provide insight into cyber attack trends, techniques, and threat methods so as to effectively cope with a cyber-attack.

In one aspects, there is provided a method for detecting and analyzing time-series data based on a cyber threat framework, the method including: an event determining operating of determining, according to a predetermined criterion, at least one target API event from an event set including a plurality of events stored in a cloud environment; a mapping operation of mapping the at least one target API event to a threat behavior type corresponding to at least one technique included in a threat behavior analysis matrix based on a pre-stored threat behavior profile, wherein the threat behavior analysis matrix comprises a plurality of tactics and at least one technique included in each of the tactics; a scenario creating operation of combining at least one of the at least one target API event based on the threat behavior type and creating at least one threat scenario; a numerical value calculating operation of calculating a degree of matching and a risk for the at least one threat scenario based on a database; a risk grade determining operating of determining a risk grade of the at least one threat scenario based on at least one of the degree of matching and the risk; a threat behavior determining operating of determining a predicted threat behavior corresponding to the at least one threat scenario based on the risk grade; and a solution providing operation of creating and providing a prompt based on the predicted threat behavior.

In the event determining operating, the target API event may be determined by filtering the event set according to a classification criterion comprising at least one of region, time, account, and behavior type.

In the mapping operation, a threat behavior type and an individual threat behavior corresponding to the target API event may be mapped based on the threat behavior profile.

The numerical value calculating operation may include calculating a degree of matching between a threat behavior type included in a past scenario pre-stored in the database and a target API event included in the at least one threat scenario by comparing the at least one threat scenario with the past scenario.

The numerical value calculating operation may include a risk calculating operation of calculating, by the main server, a risk of the at least one threat scenario based on a threat behavior type included in the at least one threat scenario.

In the risk grade determining operating, a risk grade of the at least one threat scenario may be determined based on an overall risk score calculated based on the degree of matching and the risk grade.

In the solution providing operation, a security enhancement solution prompt corresponding to the determined predicted threat behavior may be generated and provided.

In the solution providing operation, a system recovery prompt corresponding to the determined predicted threat behavior may be generated and provided.

In the solution providing operation, an analysis prompt corresponding to the determined predicted threat behavior and the at least one threat scenario may be generated and provided.

In the solution providing operation, an instructional prompt corresponding to the determined predicted threat behavior may be generated and provided.

In the risk grade determining operating, the risk grade of the at least one threat scenario may be determined based on an overall risk score calculated by assigning weights to the degree of matching and the risk grade.

The threat behavior determining operation may include: a selecting operation of selecting any one scenario from among a plurality of threat scenarios based on the risk grade; an extracting operation of extracting a past scenario having a highest degree of matching with the selected threat scenario; and a determining operation of determining a predicted threat behavior by comparing the extracted past scenario with a target API event included in the selected threat scenario.

DESCRIPTION OF EXEMPLARY EMBODIMENTS

Hereinafter, the present disclosure will be described in detail according to exemplary embodiments disclosed herein, with reference to the accompanying drawings. For the sake of brief description with reference to the drawings, the same or equivalent components may be provided with the same or similar reference numbers, and description thereof will not be repeated. In addition, in the following description of the embodiments, a detailed description of known functions and configurations incorporated herein will be omitted when it may impede the understanding of the embodiments.

While terms including ordinal numbers, such as "first" and "second," etc., may be used to describe various components, such components are not limited by the above terms. The above terms are used only to distinguish one component from another.

As used herein, the singular forms "a", "an," and "the" are intended to include the plural forms as well, unless the context clearly indicates otherwise.

In this specification, operations described may be performed regardless of a listed order, except for a case where they must be performed in the listed order due to a special causal relationship.

It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Hereinafter, the present disclosure will be described with reference to the accompanying drawings.

Figure 1:
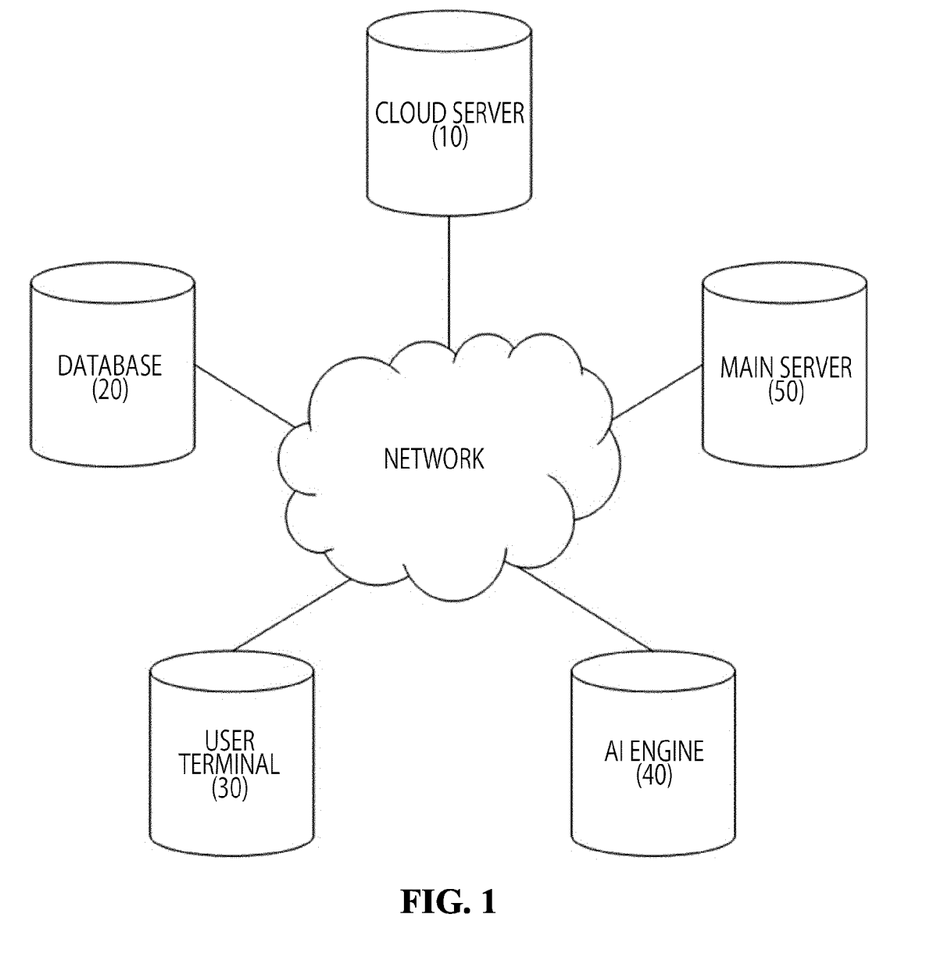
FIG. 1 is a conceptual diagram showing a network environment according to the present disclosure.
Figure 2:
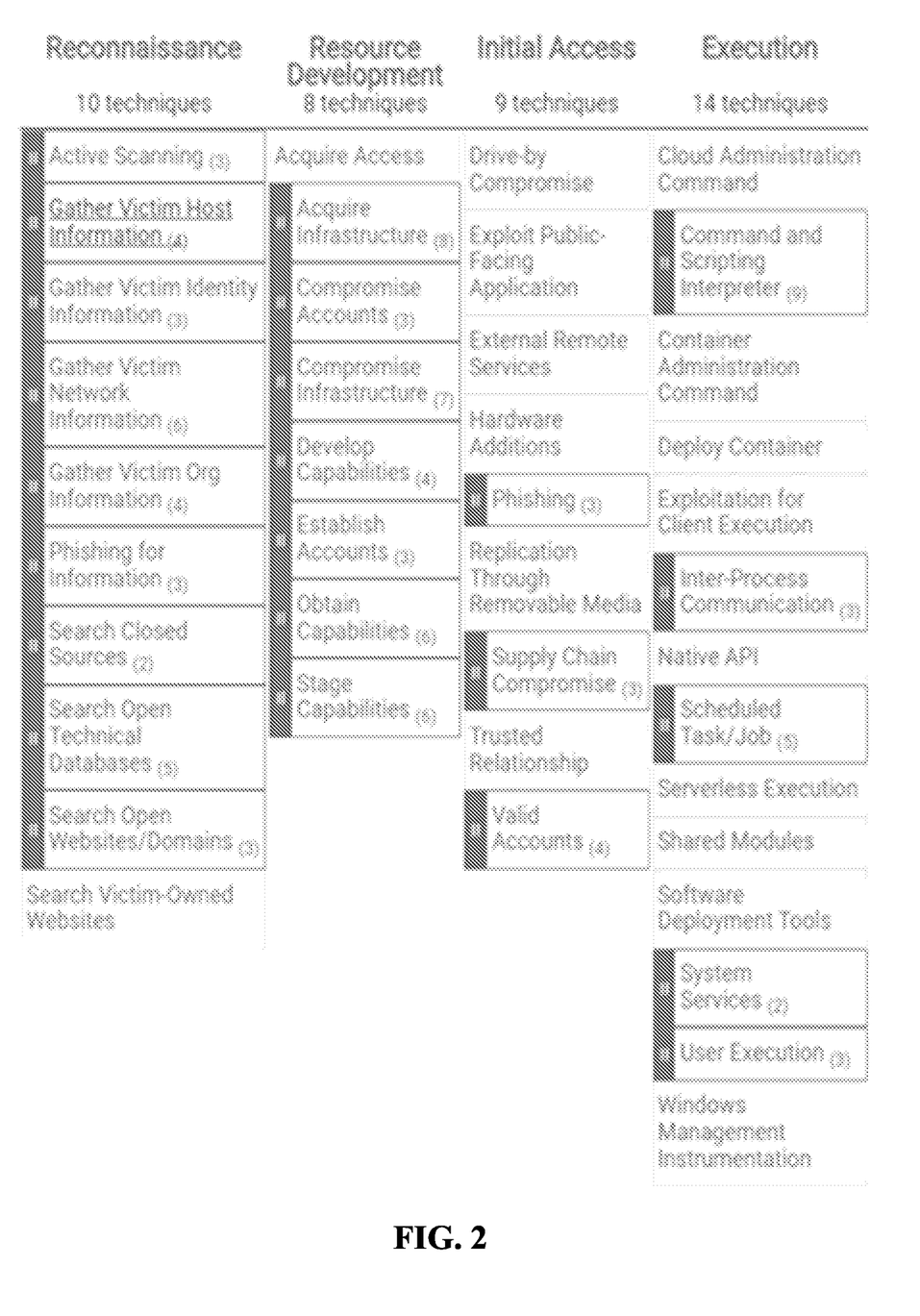
FIG. 2 is a table showing threat behavior types and individual threat behaviors according to the present disclosure.

FIG. 1 is a conceptual diagram showing a network environment according to the present disclosure, and FIG. 2 is a table showing threat behavior types and individual threat behaviors according to the present disclosure.

Referring to FIGS. 1 and 2, a system for detecting and analyzing time-series data based on a cyber threat framework according to the present disclosure may include a cloud server 10, a database 20, a user terminal 30, an AI engine 40, and a main server 50.

In this case, the cloud server 10, the database 20, the user terminal 30, the AI engine 40, and the main server 50 may be connected to each other based on communication, that is, a network. Here, the network is not limited in communication scheme, and the communication scheme may include not only a communication scheme to utilize a telecommunication network (for example, a mobile communication network, wired Internet, wireless Internet, and a broadcast network), but also a communication scheme to utilize an electric signal (for example, an analog signal, a digital signal, a signal sigil, and Pulse Width Modulation) and a short-range radio communication scheme.

The cloud server 10 refers to a server for a cloud service which is a service where an external or outsourced server and a storage are used instead of a server and a storage provided by a company. Here, the cloud server 10 may include a public data center (such as Amazon's AWS and Microsoft's Azure) for public clouds and on-premises data centers for private clouds.

The cloud server 10 may be implemented as a single computer device or a plurality of computer devices providing commands, codes, files, contents, services, and the like. The cloud server 10 may transmit and receive information in communication with other servers and terminals in the system through a network.

The cloud server 10 may store every data and infrastructure of users utilizing the cloud server 10. In this case, a specific user or user group may use a single cloud server 10 or may use a plurality of cloud servers 10.

Preferably, when the plurality of cloud servers 10 is used, an integrated control server for managing data distributed and stored in the plurality of cloud servers 10 may be provided separately. More preferably, the main server 50 to be described later may serve as the integrated control server.

The user terminal 30 is an entity that accesses a specific company or organization's data stored in the cloud server 10 to read and write data. In this case, the user terminal 30 with authorized access to the cloud server 10 may be a member of a company, organization, or group. If an unauthorized user attempts to access the cloud server 10 of the company, organization, or group, this access may be regarded as a cyber threat or attack, which is commonly known as hacking.

The user terminal 30 may be implemented as a computer device or a plurality of computer devices providing commands, codes, files, contents, services, and the like. The cloud server 10 may transmit and receive information in communication with other servers and terminals in the system through a network.

The database 20 may serve as a storage medium for storing data. Preferably, in the present disclosure, the database 20 may store cyber threats occurred in the past, that is, scenarios of hacking.

The database 20 may be implemented as a computer device or a plurality of computer devices providing commands, codes, files, contents, services, and the like. In addition, the database 20 may transmit and receive information in communication with other servers and terminals in the system through a network.

Furthermore, the database 20 may store information on actions (defensive measures) that defenders (administrators) can take to prevent and detect cyber-attacks, and may also store analyzed data on named hacking groups and their attack techniques.

Here, a scenario refers to a process in which an attacker performs step-by-step actions to carry out a cyber-attack. In such a scenario, actions performed by the attacker at each step are listed time-sequentially.

Therefore, the database 20 may basically store scenarios occurring the past, that is, past scenarios. Preferably, in this case, a scenario may be a kill chain stored in MITRE ATT&CK (Adversarial Tactics, Techniques and Common Knowledge). Specifically, MITRE ATT&CK is a cyber security-related knowledge base created by MITRE Corporation, and it is composed of tactics with categories for cyber attackers' goals and steps, and techniques which are specific methods for the tactics.

Accordingly, a threat behavior is included in at least one tactic and corresponds to at least one technique included in the tactic.

In addition, the scenarios stored in this database 20 are data that is classified and listed information on various attack groups' techniques, which are analyzed in terms of tactics and techniques, regarding adversary behaviors employed by attackers in cyber-attacks. Specifically, a scenario includes at least one technique, which is a single step, as a method for an attacker to achieve at least one tactic, which is an attack goal. For example, a threat behavior type corresponding to a technique may include Spearphishing via Email, Drive-by Compromise, Credential Dumping, Man-in-the-Middle attack (MitM), Command and Control over alternative protocol, etc.

The AI engine 40 may refer to an existing artificial intelligence (AI) engine. That is, the AI engine 40 may refer to any of various existing AI engines 40. Such an AI engine 40 may provide a data filtering or mapping function.

The AI engine 40 may be implemented as a computer device or a plurality of computer devices providing commands, codes, files, contents, services, and the like. In addition, the AI engine 40 may transmit and receive information in communication with other servers and terminals in the system through a network.

As described above, the main server 50 performs the integrated control function for the plurality of cloud servers 10 and, at the same time, detects and analyzes cyber threats to provide various prompts to an authorized user terminal 30, that is, a user terminal of a defender (administrator).

The main server 50 may be implemented as a computer device or a plurality of computer devices providing commands, codes, files, contents, services, and the like. The main server 50 may transmit and receive information in communication with other servers and terminals in the system through a network.

Figure 3:
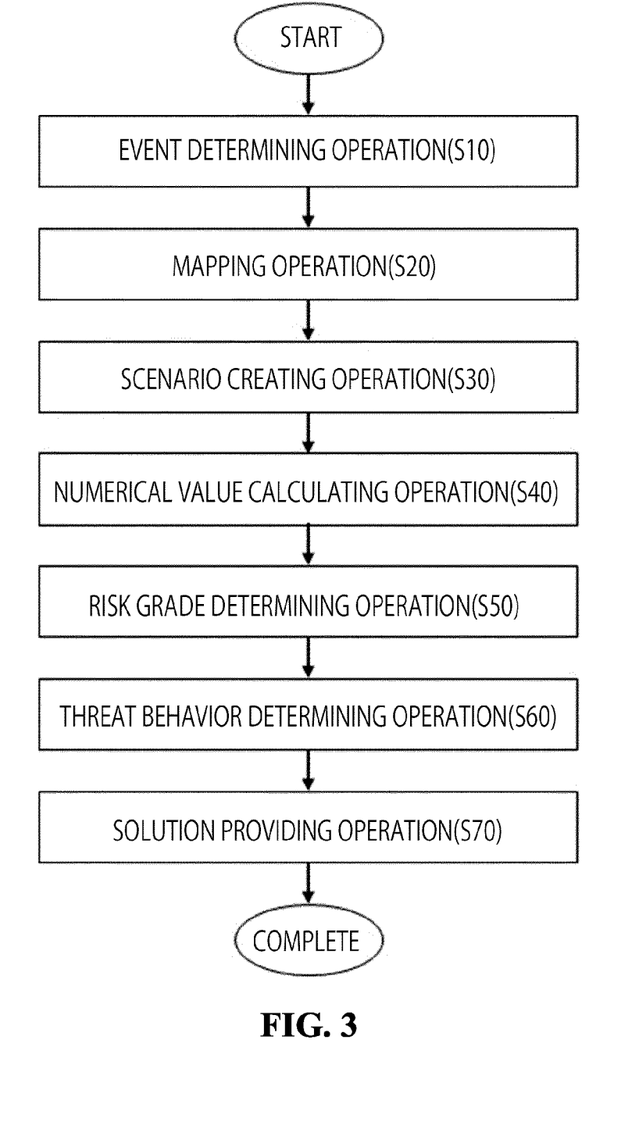
FIG. 3 is a flow chart showing a method for detection and analysis according to the present disclosure.
Figure 4:
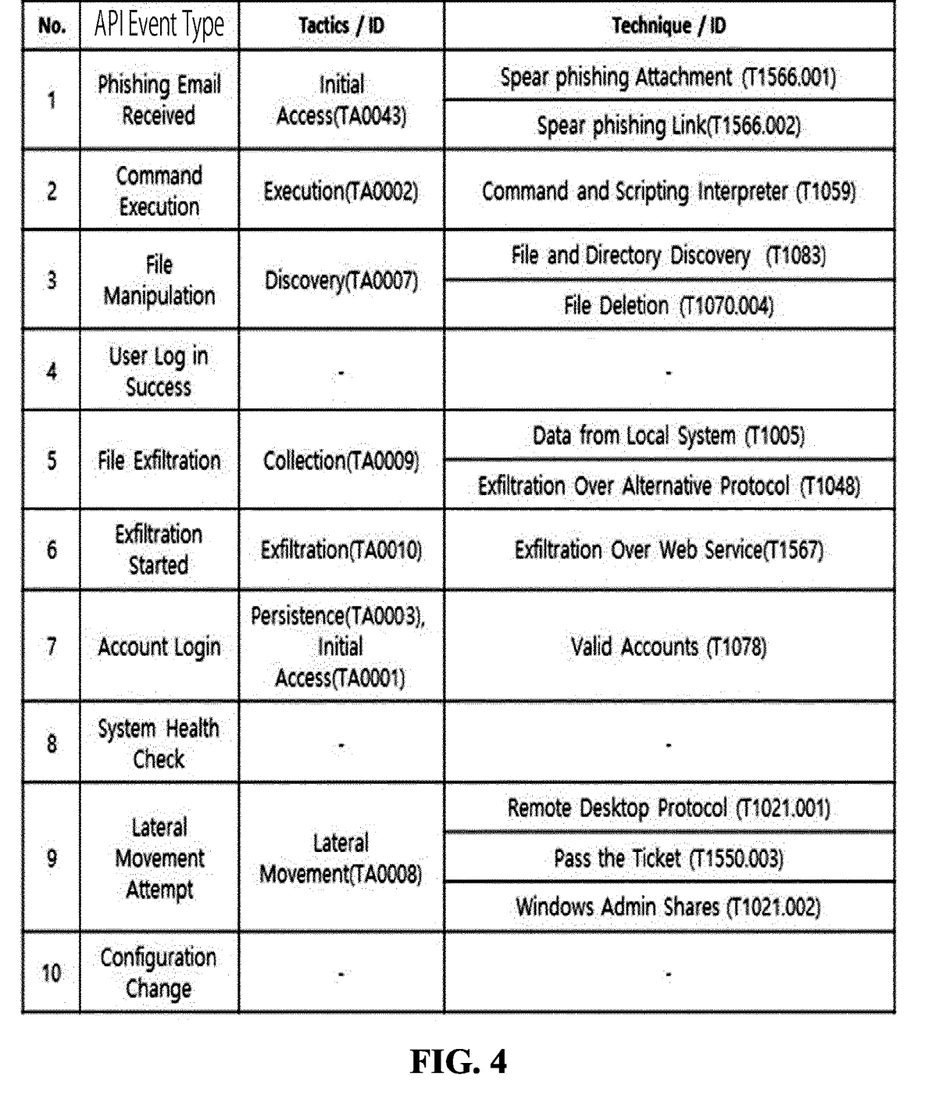
FIG. 4 is a table showing the mapping results according to the present disclosure.
Figure 5:
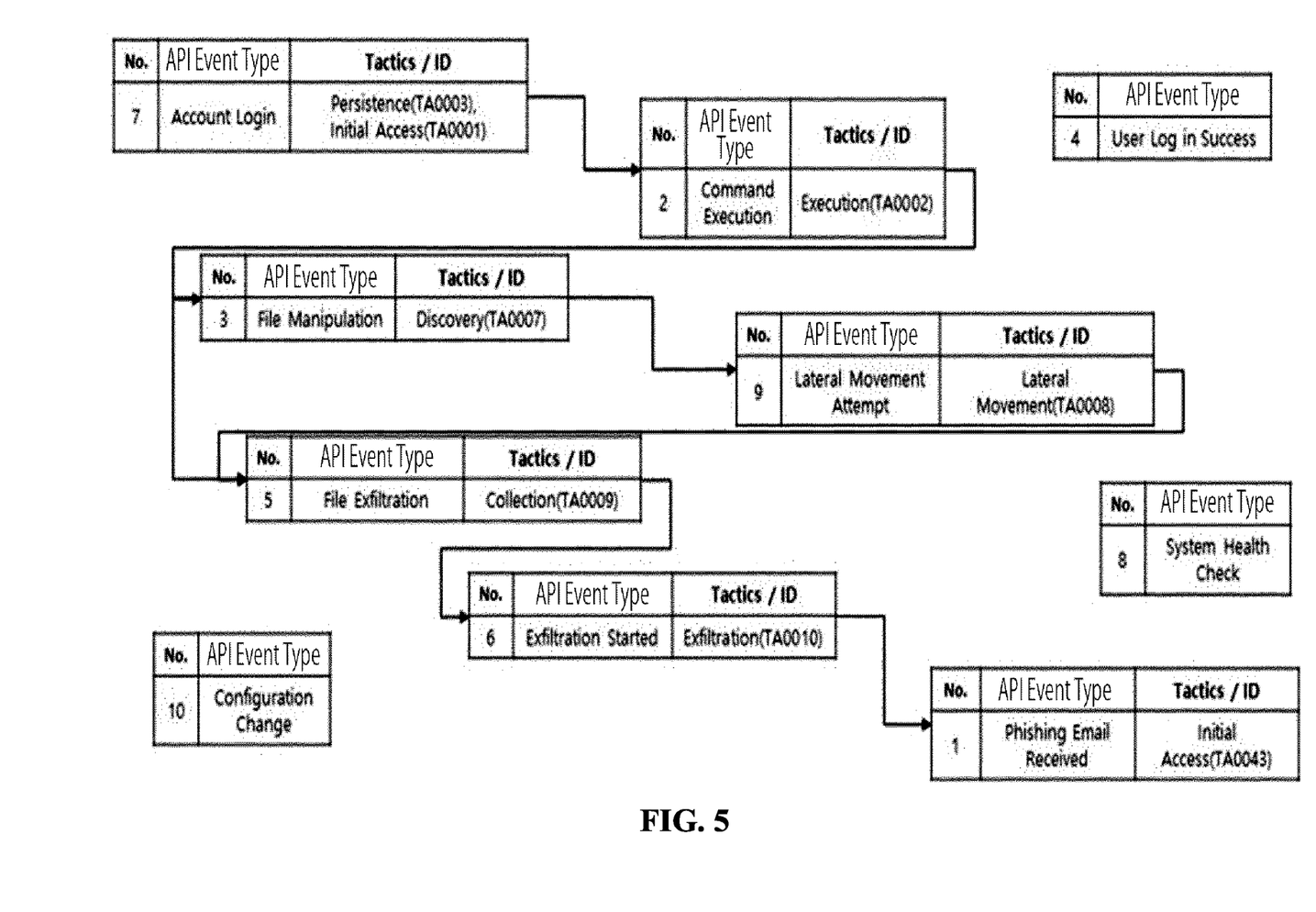
FIG. 5 is a conceptual diagram illustrating an example of generating a threat scenario according to the present disclosure.
Figure 6:
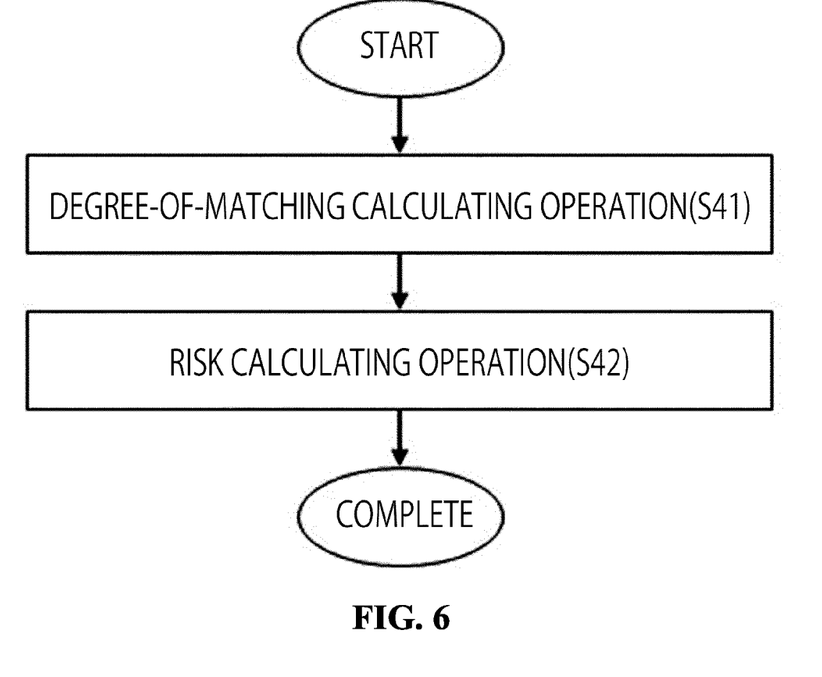
FIG. 6 is a flow chart showing an operation of calculating a numerical value according to the present disclosure.
Figure 7:
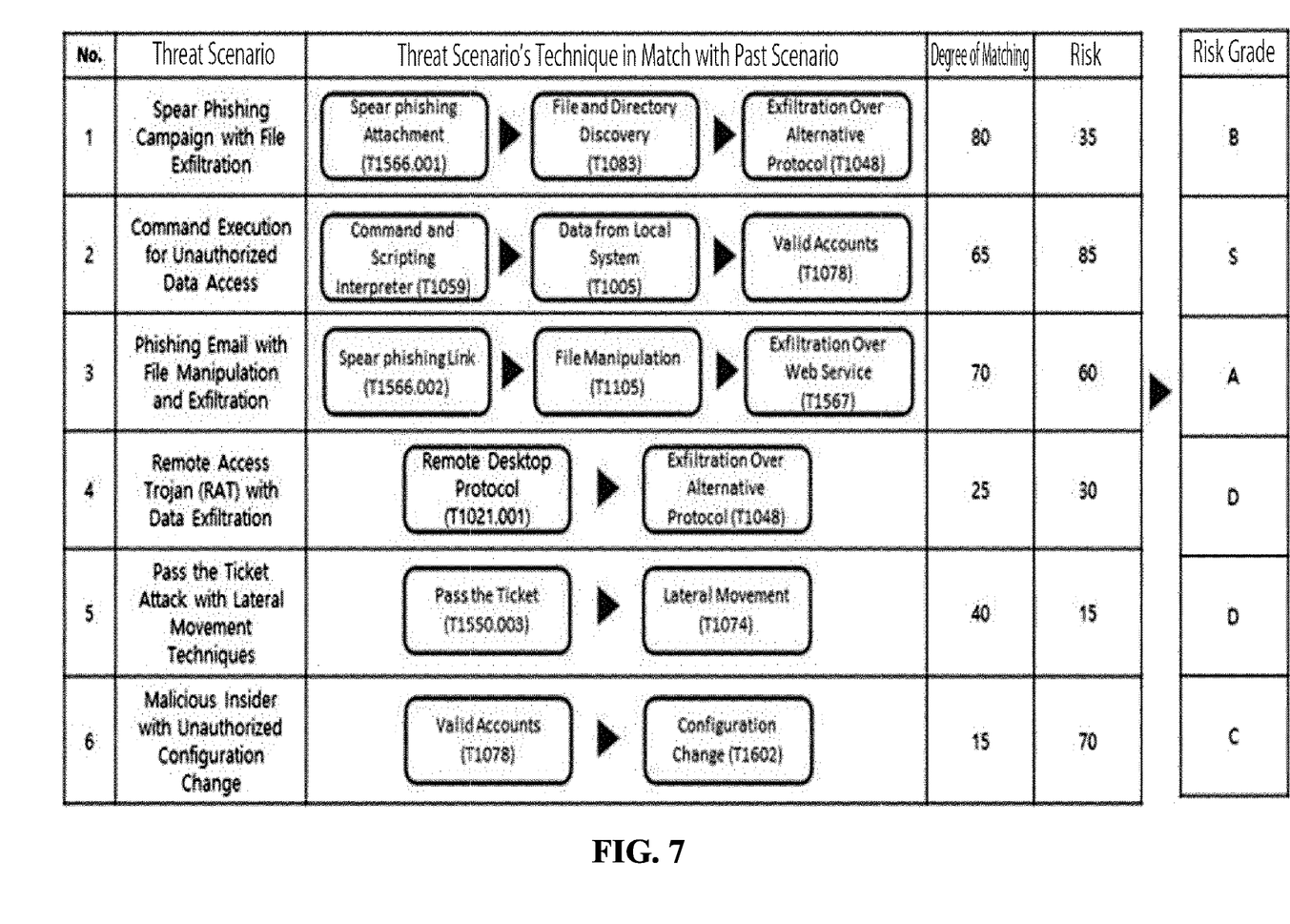
FIG. 7 is a conceptual diagram showing an example of how to calculate a numerical value and a grade according to the present disclosure.
Figure 8:
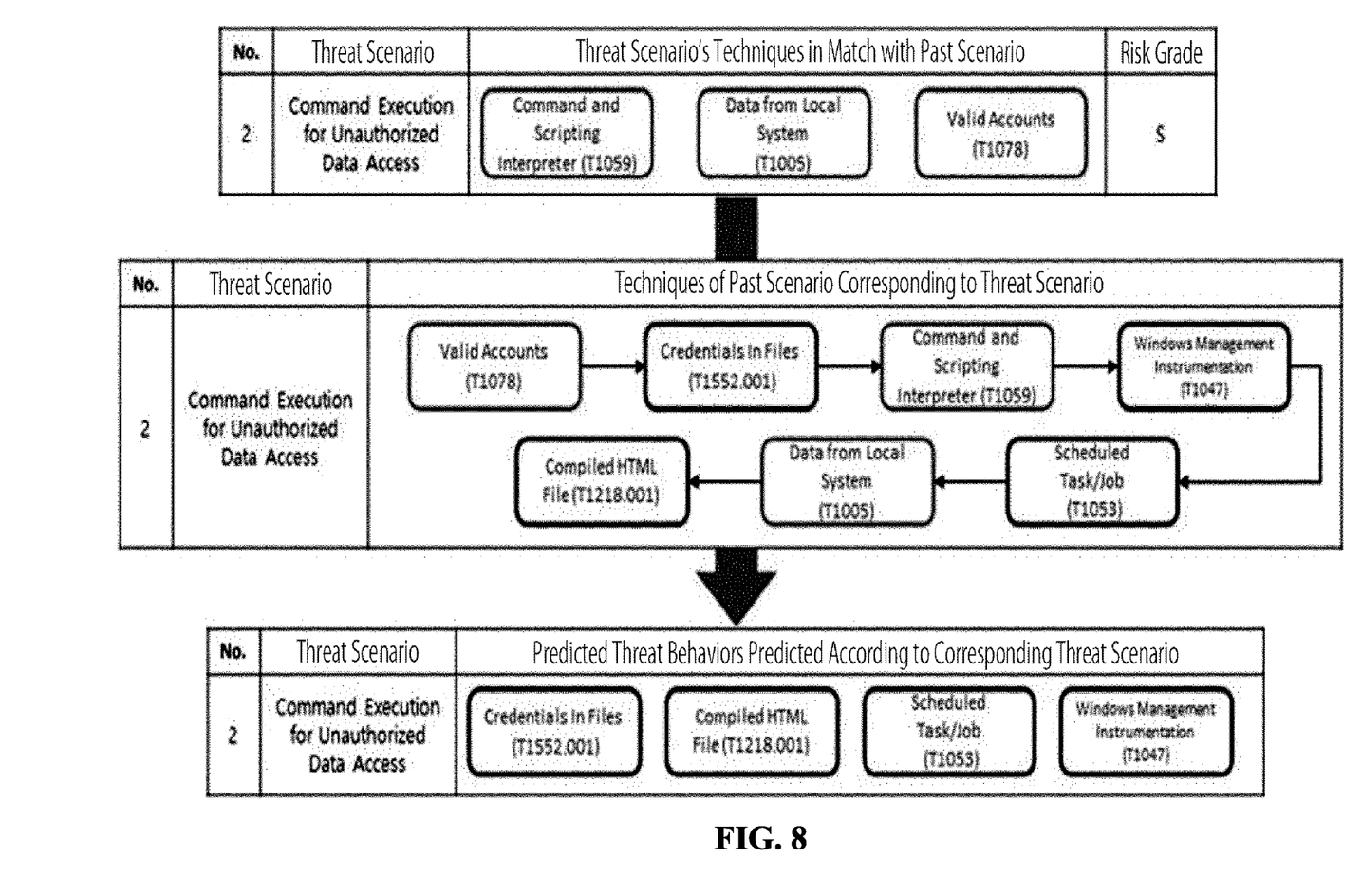
FIG. 8 is a conceptual diagram showing an example of how to determine a threat behavior according to the present disclosure.
Figure 9:
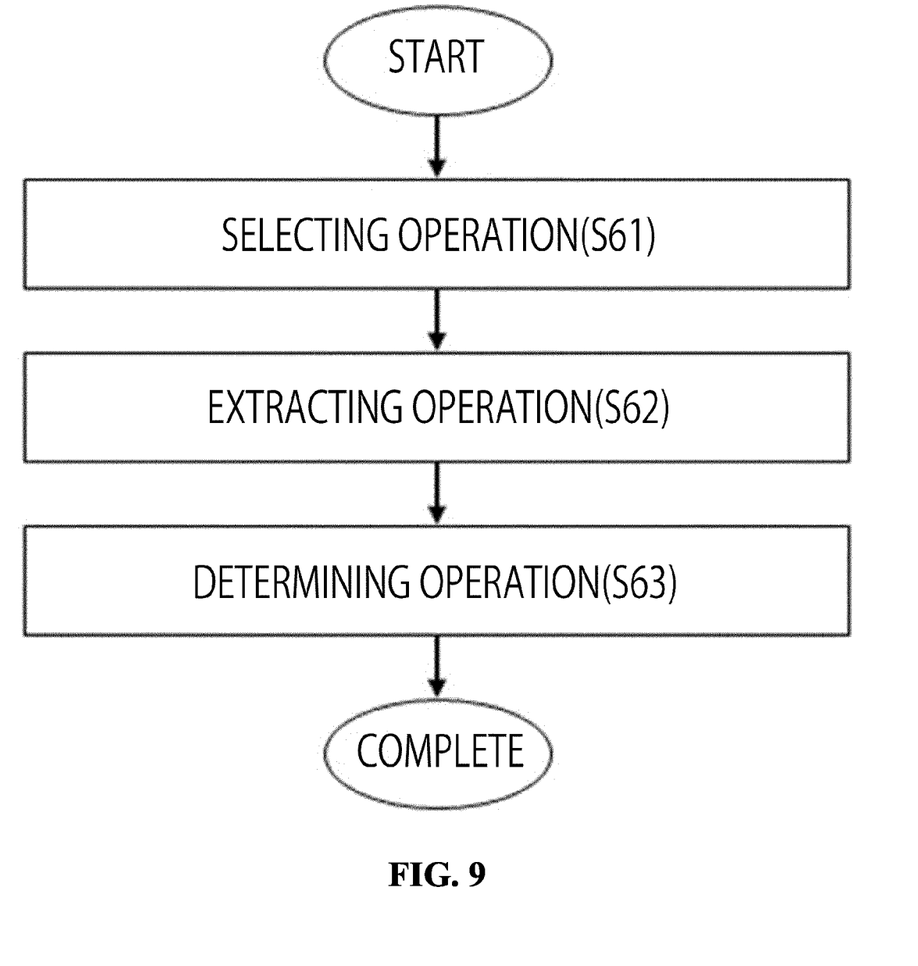
FIG. 9 is a flowchart illustrating an operation of determining a threat behavior according to the present disclosure.

FIG. 3 is a flow chart showing a method for detection and analysis according to the present disclosure; FIG. 4 is a table showing the mapping results according to the present disclosure; FIG. 5 is a conceptual diagram illustrating an example of generating a threat scenario according to the present disclosure; FIG. 6 is a flow chart showing an operation of calculating a numerical value according to the present disclosure; FIG. 7 is a conceptual diagram showing an example of how to calculate a numerical value and a grade according to the present disclosure; FIG. 8 is a conceptual diagram showing an example of how to determine a threat behavior according to the present disclosure; and FIG. 9 is a flowchart illustrating an operation of determining a threat behavior according to the present disclosure.

Referring to FIGS. 3 to 9, a method for detecting and analyzing time-series data based on a cyber threat framework according to the present disclosure may include an event determining operation S10, a mapping operation S20, a scenario creating operation S30, a numerical value calculating operation S40, a risk grade determining operation S50, a threat behavior determining operation S60, and a solution providing operation S70.

In the event determining operation S10, according to a predetermined criterion, the main server 50 may determine at least one target API event from an event set including a plurality of events stored in a cloud environment established through the cloud server 10.

In the cloud server 10, every action (event) occurring due to the user terminal 30 in a web page or application of a corresponding company, organization, or group is stored in the form of an API. In this case, an event set including a plurality of consecutive events occurring due to the user terminal 30 is generated.

Accordingly, the event set including the plurality of events may be stored in the cloud environment. Here, according to a predetermined criterion, a target API event to be detected and analyzed may be determined from among the events included in the stored event set.

In this case, filtering may be performed on the event set according to the predetermined criterion to determine a plurality of target API events.

In one embodiment, the target API event may be determined by performing filtering on a plurality of events according to a classification condition including at least one of region, time, account, and behavior type.

Here, the region may be referred to as a region where an API is created, and the region may be identified based on an IP where the API is created. Therefore, by performing filtering on the stored event set by region of creation, only an event occurring in a specific region may be determined as a target API event.

The time may refer to a time when an API is created, and only an event occurring in a specific time period may be determined as a target API event by filtering the stored event set according to a created time period.

The account may be referred to as an account in which an API is created, and by filtering only a specific account from accounts which have accessed a corresponding website or application and performed an action, only an event occurring in the specific account in the event set may be determined as a target API event.

In this case, a risk of the threat scenario may be a maximum value of risks of a plurality of threat behavior types included in the threat scenario.

In one embodiment, the numerical value calculating operation S40 may include a degree-of-matching calculating operation S41 and a risk calculating operation S42.

In the degree-of-matching calculating operation S41, the main server 50 compares the threat scenario with a past scenario pre-stored in the database 20 to calculate a degree of matching between a threat behavior type included in the past scenario and a target API event included in the threat scenario.

The past scenario stored in the database 20 refer to a scenario of attacks performed by an attacker in the past, that is, a scenario of threat behaviors. In other words, threat behavior types actually performed by an attacker in the past and individual threat behaviors included in the threat behavior types are listed time-sequentially in the past scenario.

Therefore, a past scenario include a plurality of threat behavior types, and a threat scenario also include at least one target API event. Therefore, based on calculated degrees of matching between each past scenario and each threat scenario, a threat scenario having a highest degree of matching with the past scenarios stored in the database 20 may be identified among threat scenarios.

In this case, a degree of matching may be shown as a numerical value, and a degree of similarity between a past scenario and a threat scenario may be calculated as the degree of matching.

Here, preferably, the degrees of matching with all past scenarios stored in the database 20 and a corresponding threat scenario may be calculated, and a maximum value of the calculated degrees of matching may be determined as the degree of matching for the threat scenario.

In the risk calculating operation S42, the main server 50 may calculate a risk of a threat scenario according to a threat behavior type included in the threat scenario.

Here, the risk of the threat scenario may be a maximum value of risks of the threat behavior types included in the threat scenario.

Therefore, preferably, when calculating a risk, a process of presetting a risk of every threat behavior type included in the database 20 may be performed.

Thereafter, a threat behavior type included in the threat scenario may be compared with the database 20 to calculate a risk of every threat behavior type included in the threat scenario and determine a maximum value of the calculated risks as a risk of the threat scenario.

For example, if a threat scenario includes only a threat behavior type of initial access, the risk is relatively low, but if a threat scenario includes credential access, the risk is higher than that of the threat scenario including only initial access.

In the risk grade determining operation S50, the main server 50 may determine a risk grade of the threat scenario based on at least one of the degree of matching and the risk.

The risk grade may be determined based on how much the threat scenario matches a past scenario (degree of matching) and how high the risk of the threat activity included in the threat scenario is (risk).

Here, a method of determining a risk grade based on a degree of matching and a risk calculated for a threat scenario is not limited. Preferably, if at least one of the degree of matching and the risk is higher or if the degree of matching and the risk are higher, the higher risk grade may be set.

In this case, in the risk grade determining operation S50, a risk grade of the threat scenario may be determined based on at least one of the degree of matching and the risk. More preferably, the risk grade of the threat scenario may be determined based on the degree of matching and the risk. In other words, the risk grade of the threat scenario may be determined in consideration of both the degree of matching and the risk.

In one embodiment, an overall risk score may be calculated based on the degree of matching and the risk, and a risk grade of the threat scenario may be determined based on the overall risk score.

In this case, in calculating the overall risk score, the same weights may be assigned to the degree of matching and the risk. In one embodiment, however, the overall risk score may be calculated by assigning different weights to the degree of matching and the risk.

In other words, the degree of matching and the risk grade may have different weights. The weights respectively assigned to the degree of matching and the risk grade may be values set by an administrator (defender). There is no separate limitation in the weights.

Therefore, a risk grade of each threat scenario may be set based on an overall risk score calculated by assigning weights to a degree of matching and a risk.

In the threat behavior determining operation S60, the main server 50 determines a threat behavior corresponding to the threat scenario based on the risk grade.

Here, determining a threat behavior in the threat behavior determining operation S60 may be determining a threat behavior (target API event) belonging to a threat scenario having a highest risk grade and a predicted threat behavior to be additionally included in the threat scenario.

In other words, the threat behavior determining operation S60 may be an operation of determining a predicted threat behavior, which is an individual threat behavior not included in the threat scenario but predicted to be additionally included in the threat scenario based on past scenarios.

In one embodiment, the threat behavior determining operation S61 may include a selecting operation S61, an extracting operation S62, and a determining operation S63.

In the selecting operation S61, the main server 50 selects one of a plurality of threat scenarios based on the risk grade. Preferably, a threat scenario having a highest risk grade may be selected, or only a plurality of threat scenarios having high risk grades may be selected in descending order of risk grades.

In the extracting operation S62, the main server 50 extracts a past scenario having a highest degree of matching with the selected threat scenario. In the above-described degree-of-matching calculating operation S41, it has been described that the degree of matching between a threat scenario and each past scenario is calculated and a maximum value of calculated consistencies is the degree of matching for the threat scenario. Thus, the past scenario determined to have a highest degree of matching with the corresponding threat scenario is extracted.

In the determining operation S63, the main server 50 compares the extracted past scenario with the threat behavior type included in the selected threat scenario to determine a predicted threat behavior.

Here, the predicted threat behavior refers to an individual threat behavior that is included in the threat behavior type from the extracted past scenario, but not included in the current threat scenario.

In other words, in the extracted historical scenario, there may be a threat behavior type that is not included in the threat scenarios, and such a threat behavior type include individual threat behaviors. Thus, any individual threat behavior predicted to be performed by an attacker according to the threat scenario is determined as a predicted threat behavior.

In the solution providing operation S70, the main server 50 may generate a prompt based on the determined predicted threat behavior and provide the user terminal 30 with the prompt.

For example, in the solution providing operation S70, the main server 50 may generate a security enhancement solution prompt corresponding to the determined predicted threat behavior and provide the user terminal 30 with the security enhancement solution prompt.

Here, the security enhancement solution prompt may be a prompt associated with a solution that compensates for vulnerabilities of the determined predicted threat behavior and enhances security settings. The security enhancement solution prompt may include security setting guides, patch and update guides, and optimal setting methods for security tools.

The security enhancement solution prompt may also provide intelligence on how to detect and cope with a determined predicted threat behavior. Here, the security enhancement solution prompt may include a method for improving a threat detecting algorithm, a method for applying anomaly detection, and standard operating procedures (SOPs) for quick response.

For example, in the solution providing operation S70, the main server 50 may generate a system recovery prompt corresponding to the determined predicted threat behavior and provide the user terminal 30 with the system recovery prompt.

Here, the system recovery prompt may include a guide for system recovery and best practices for a recovery process. Furthermore, the system recovery prompt may include guides on how to minimize an additional threat caused by the determined predicted threat behavior, and instructions required to restore the system to a safe state.

For example, in the solution providing operation S70, the main server 50 may generate an analysis prompt corresponding to the determined predicted threat behavior and the threat scenario and provide the user terminal 30 with the analysis prompt.

Here, the analysis prompt may provide detailed log information on each individual API event involved in the threat scenario, providing information on which TTPS was used, which user or system was targeted, which data was at risk, and which parts of the system were vulnerable.

For example, in the solution providing operation S70, the main server 50 may generate an instructional prompt corresponding to the determined predicted threat behavior and provide the user terminal 30 with the instructional prompt.

Here, the instructional prompt may be a message or material for training a user in preparation for the determined predicted threat behavior. The instructional prompt may include a description of the determined predicted threat behavior, precautions, safe use methods, and the like.

In the method for detecting and analyzing time-series data based on a cyber threat framework of the present invention, it is possible to analyze a large amount of cyber security data to provide insight into cyber attack trends, techniques, and threat methods so as to effectively cope with a cyber-attack.

The technical features disclosed in each embodiment of the present disclosure are not limited to a corresponding embodiment, and unless incompatible with each other, the technical features disclosed in each embodiment may be applied in combination to other embodiments.

Although embodiments of the preset disclosure are described mainly about individual technical features, the technical features of the embodiments may be applied in combination, unless incompatible with each other.

The present disclosure is not limited to the above-described embodiments and the accompanying drawings, and various modifications and changes may be made in view of a person skilled in the art to which the present disclosure pertains. Therefore, the scope of the present disclosure should be defined by not only the claims of this specification but also those equivalent to these claims.

What is claimed is:

1. A method for detecting and analyzing time-series data based on a cyber threat framework, the method comprising:
an event determining operating of determining, according to a predetermined criterion, at least one target API event from an event set including a plurality of events stored in a cloud environment;
a mapping operation of mapping the at least one target API event to a threat behavior type corresponding to at least one technique included in a threat behavior analysis matrix based on a pre-stored threat behavior profile, wherein the threat behavior analysis matrix comprises a plurality of tactics and at least one technique included in each of the tactics;
a scenario creating operation of combining at least one of the at least one target API event based on the threat behavior type and creating at least one threat scenario;
a numerical value calculating operation of calculating a degree of matching and a risk for the at least one threat scenario based on a database, wherein the numerical value calculating operation comprises a risk calculating operation of calculating, by the main server, a risk of the at least one threat scenario based on a threat behavior type included in the at least one threat scenario;
a risk grade determining operating of determining a risk grade of the at least one threat scenario based on at least one of the degree of matching and the risk, wherein in the risk grade determining operating, a risk grade of the at least one threat scenario is determined based on an overall risk score calculated based on the degree of matching and the risk;
a threat behavior determining operating of determining a predicted threat behavior corresponding to the at least one threat scenario based on the risk grade; and
a solution providing operation of creating and providing a prompt based on the predicted threat behavior.

2. The method of claim 1, wherein in the event determining operating, the target API event is determined by filtering the event set according to a classification criterion comprising at least one of region, time, account, and behavior type.

3. The method of claim 1, wherein in the mapping operation, a threat behavior type and an individual threat behavior corresponding to the target API event are mapped based on the threat behavior profile.

4. The method of claim 1, wherein the numerical value calculating operation comprises calculating a degree of matching between a threat behavior type included in a past scenario pre-stored in the database and a target API event included in the at least one threat scenario by comparing the at least one threat scenario with the past scenario.

5. The method of claim 1, wherein in the solution providing operation, a security enhancement solution prompt corresponding to the determined predicted threat behavior is generated and provided.

6. The method of claim 1, wherein in the solution providing operation, a system recovery prompt corresponding to the determined predicted threat behavior is generated and provided.

7. The method of claim 1, wherein in the solution providing operation, an analysis prompt corresponding to the determined predicted threat behavior and the at least one threat scenario is generated and provided.

8. The method of claim 1, wherein in the solution providing operation, an instructional prompt corresponding to the determined predicted threat behavior is generated and provided.

9. The method of claim 1, wherein, in the risk grade determining operating, the risk grade of the at least one threat scenario is determined based on an overall risk score calculated by assigning weights to the degree of matching and the risk grade.

10. The method of claim 1, wherein the threat behavior determining operation comprises:

a selecting operation of selecting any one threat scenario from among a plurality of threat scenarios based on the risk grade;

an extracting operation of extracting a past scenario having a highest degree of matching with the selected threat scenario; and a determining operation of determining a predicted threat behavior by comparing the extracted past scenario with a target API event included in the selected threat scenario.

* * * * *